March 20, 1951 N. M. GRIFFIN 2,545,577
DETACHABLE EXTENSION FOR PRESSURE COOKERS
Filed Nov. 9, 1948
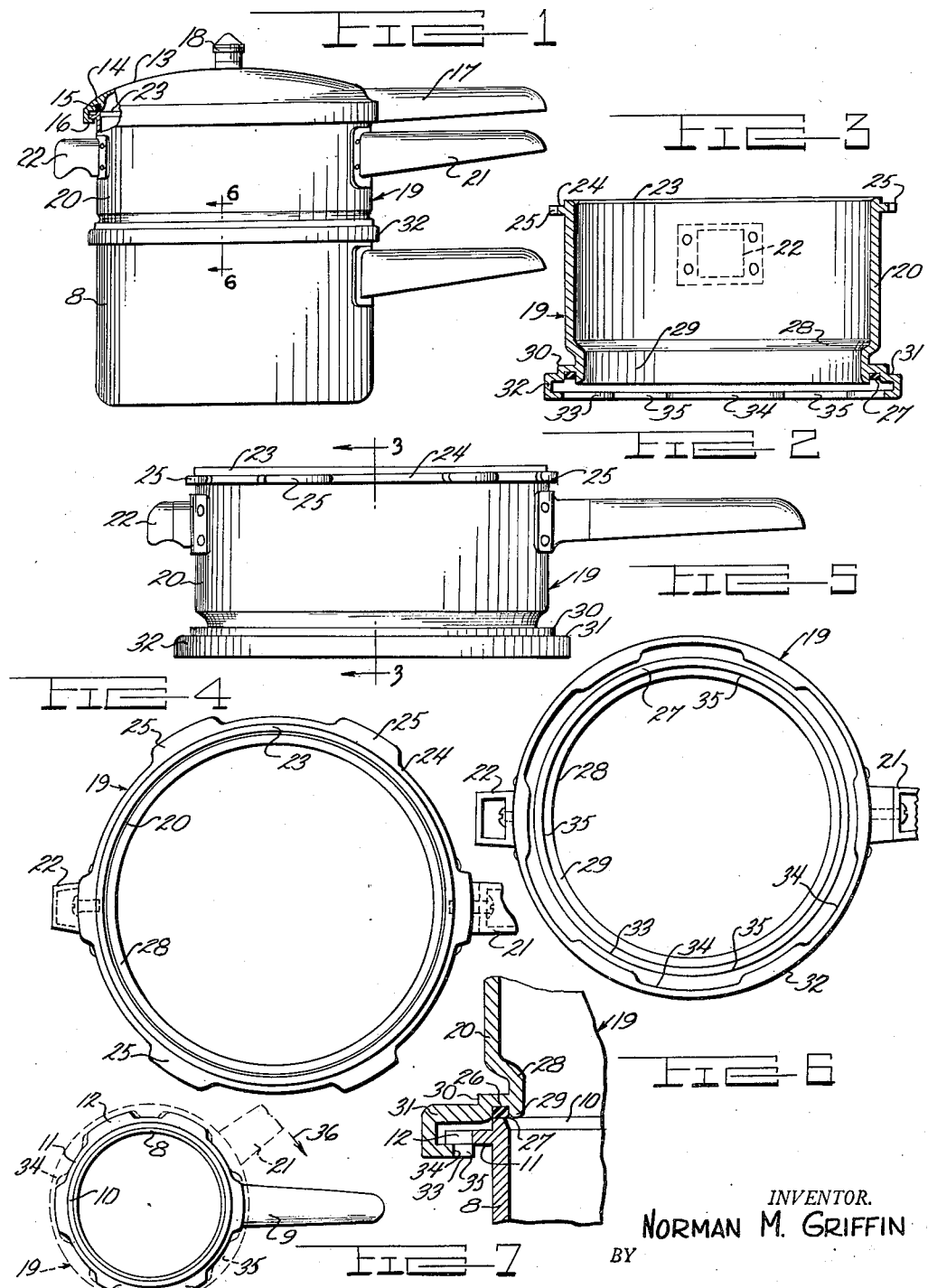
INVENTOR.
NORMAN M. GRIFFIN
BY
McMorrow, Berman & Davidson
ATTORNEYS Patented Mar. 20, 1951

2,545,577

UNITED STATES PATENT OFFICE 2,545,577

DETACHABLE EXTENSION FOR PRESSURE COOKERS

Norman M. Griffin, Boston, Mass.

Application November 9, 1948, Serial No. 59,137

1 Claim. (Cl. 220—4)

This invention relates to pressure cookers, and means for increasing the capacity thereof, and particularly to an extension for a pressure cooker.

The main object of my invention is to provide a pressure cooker with removable means for increasing the capacity thereof beyond its normal stated or fixed capacity in order to eliminate the necessity and expense of having a plurality of complete cookers for various amounts of food or the like to be cooked.

Another object is to provide a pressure cooker with a detachable section which is readily interposed between the cooker proper and the top or cover, and also interchangeable with at least one other section of different size to provide for several different capacities of the cooker according to requirement.

A further object is to have, as it were, a single complete pressure cooker with several sections which may be attached singly or together to the cooker proper to further increase or vary the capacity of the latter.

It is also an object to provide a cooker proper and the one or more detachable sections thereof, as well as the top or cover, with simple and instantly operative engagement means of mutually interfitting character.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a pressure cooker and the cover therefor with the detachable extension intermediate the cooker proper and the cover which embodies the invention in a practial form;

Figure 2 is a side elevation of the detachable cooker extension alone and shown on an enlarged scale;

Figure 3 is a vertical section taken on line 3—3 in Figure 2;

Figure 4 is a plan view of the cooker section of Figure 2;

Figure 5 is a bottom plan view of the same cooker section;

Figure 6 is a fragmentary vertical section taken on line 6—6 in Figure 1;

Figure 7 is a plan view of the cooker section of Figures 2 and 4 on a reduced scale and showing in broken lines the relation of the same to the cooker proper, in order to illustrate the manner in which the two members are attached to each other or detached from each other.

In the various views, the same reference numerals indicate the same or like parts.

As is well known, pressure cookers always include a vessel and a cover adapted to be firmly secured thereto, the cover having a valve, and such cookers being sold on the market in various sizes which differ by steps of one or two quarts each. Among the different pressure cookers manufactured, the same principle holds true, namely, that in order to obtain the advantage of a cooker of large capacity, a housewife owning one of small capacity must necessarily have a complete pressure cooker of the larger capacity desired independently of the smaller cooker, and in fact, must have cookers of various capacities each complete in itself despite the fact that such complete equipment for each size entails expense, the use of a greater amount of material for manufacture, and also a greater amount of storage space required for storing the vessels and their covers when not in use.

Upon considering this problem, it has occurred to me that a single pressure cooker of a reasonable capacity should suffice for a range of sizes and capacities of cooker by simply having one complete pressure cooker and one or more detachable and interchangeable extension members for increasing the capacity of the one complete cooker involved. As a result, I have succeeded in producing a detachable extension for a pressure cooker, as will now be more fully described.

Hence, in the practice of my invention, and referring again to the drawing, a cooking vessel 8 forming the main portion of a pressure cooker is provided with conventional handles 9 and an accurately-cut upper edge 10 surrounded by a horizontal flange 11 which is enlarged at a plurality of equidistantly-spaced points into horizontal locking projections 12, 12, etc., the flange 11 and the integral projections 12, 12 thereon being spaced a short distance below the upper edge 10 for a reason which will now be explained.

Normally, a cover 13 having an internal downwardly-facing groove 14 occupied by a rubber or other resilient ring 15 forming a gasket is adapted to fit upon the top or edge of the vessel at 10 while spaced below the ring 15 is an inwardly-extending flange 16 having cut-out portions adapted to clear the projections 12, 12 on the vessel 8 to allow the remaining portions of the flange 16 to engage beneath the peripheral flange projections 12, 12 on the upper portion of vessel 8 when the handle 17 of the lid or cover 13 is partly rotated until it is substantially directly above the handle 9 on the mentioned vessel 8. Thus far the feature of having a cover or lid 13 fitting upon the vessel 8 is, generally speaking, more or less conventional and the cover in addition has the more or less conventional valve 18 upon the upper central portion thereof for controlling the pressure within the vessel. Obviously, when the cover or lid 13 is in place, the vessel 8 is rated to have a definite capacity, such as for example, four quarts or six quarts, or the like, and when only the cover 13 is applied, it is definitely limited to its rated capacity, and if a greater capacity is desired, another vessel must be used complete with cover, valve and other features independently of the vessel 8 and cover 13.

Although the lid or cover 13 is not shown directly applied to the vessel 8, as just outlined, its application thereto may readily be understood from conventional practice inasmuch as the invention is a departure from conventional practice in another feature, namely, that in order to increase the capacity of the pressure cooker as a whole, an upper extension 19 is interposed between the vessel 8 and its cover 13 in such fashion as to form virtually an upward hollow cylindrical continuation of the mentioned vessel 8, primarily including the cylindrical wall 20 having a projecting handle 21 secured at one side thereof and at the opposite side a hooked support 22 which facilitates handling extension 19 when it is to be set in place or removed from vessel 8 beneath it. This continuation 19 is provided at the upper portion thereof with an accurately cut upper edge 23 which in form and dimensions resembles the upper edge 10 on vessel 8, while below the upper edge 23 is located the horizontal flange 24 having a plurality of flange projections 25, 25 similar to the previously-mentioned flange projections 12, 12 on flange 11. The arrangement is such that the cover or lid 13 is capable of engaging its annular ring 15 of rubber or other resilient material upon the upper edge 23 of the extension 19, while the flange 16 which is not shown in great detail is adapted to engage beneath the projections 25, 25 of flange 24 in such fashion as to close the upper end of cylindrical extension 19 in the same manner as this cover would normally engage with and close the upper end of the vessel 8 in the absence of extension 19.

Upon the lower portion of cylindrical extension 19 the internal features and details in every respect resemble the interior flange portions of cover 13, but are shown in greater detail so that from the enlarged details of this extension 19 the construction of the cover may also be more clearly understood. Thus, at the lower end of the peripheral wall 20 is a groove 26 facing downward and occupied by a resilient ring or gasket of rubber or other resilient material 27 adapted to engage directly upon the upper edge 10 of vessel 8 previously referred to, and in this manner the intermediate member or extension 19 engages upon the upper edge 10 instead of the cover engaging thereon, inasmuch as the cover now engages upon the upper edge 23 of this extension instead.

Intermediate the peripheral wall 20 and the groove 26 occupied by ring or gasket 27 is an inwardly-directed portion 28 upon the wall 20 which serves to direct liquids entering from above inwardly away from the upper edge 10 of vessel 8 and away from the resilient gasket 27 and terminating inwardly of the groove 26 in the inner pendent apron 29. Exteriorly upon the apron 29 the intermediate portion is continued horizontally outward at 30, and then downward to form the previously-mentioned groove 26 and is integral with the outwardly-extending flange 31 which terminates at the outer periphery in a downwardly-extending cylindrical skirt-like portion 32 which at the lower edge is integral with an inwardly-directed neck-like horizontal ledge 33 having a plurality of equidistantly-spaced cut-out portions 34, 34 resulting in isolated spaced inwardly-projecting flange portions 35, 35. The cut-out portions 34, 34 are of equal number with the peripheral projections 25, 25 adjacent to the upper edge 23 of cylindrical member or extension 19 and the corresponding peripheral projections 12, 12 on the upper end of vessel 8.

The arrangement is such that when the mentioned vessel 8 is to be increased in capacity, referring to Figure 7, the cylindrical extension member 19 is superposed upon the vessel 8 in such fashion that the cut-out portions 34, 34 match the peripheral projections 12, 12 on vessel 8 when the handle 21 of the extension will be disposed at an angle with handle 9 of the vessel. In this position, the rubber gasket or ring 27 within the lower end of extension 19 will rest upon the upper edge 10 of vessel 8, and it is then but necessary to partly rotate handle 21 clockwise in the direction of arrow 26 until it is directly above handle 9 when the inwardly-projecting flange portions 35, 35 at the lower end of the extension member will engage beneath the flange projections 12, 12 of the cooking vessel and will be hermetically sealed together so long as the handles 9 and 21 are directly in vertical line above the other. In similar fashion, the cover 13 is applied to the upper end of cylindrical extension member 19 to lie with its rubber ring 15 on upper edge 23 of said extension and handle 7 brought into line above handle 21 on extension 19, thus bringing all handles 9, 21 and 17 vertically above one another in assembled and locked relation of vessel 8, extension 19 and cover 13. If then the valve member 18 is manipulated to close the same, any liquid contents within the ensemble may be heated and generation of steam will immediately cause pressure to be exerted upon the contents of the vessel thus assembled with its extension. It is self-evident that when the vessel is thus built up by means of extension 19, its capacity is increased by the internal capacity of the extension which may be rated at two, three, four or more quarts, while the vessel itself may be rated for example, at four quarts or any other capacity with which to begin to add up the entire capacity of the vessel when increased with an extension mounted thereon. Naturally, when the extension member 19 is to be dissociated from vessel 8, a mere partial rotation in counter-clockwise direction by means of its handle 21 will immediately disengage the inwardly-projecting flange portions 35, 35 thereof from beneath the projecting flange portions 12, 12 of vessel 8 when the extension is readily lifted off. In similar fashion, the cover 13 is readily removed from the extension member by partially rotating its handle 17 counter-clockwise and lifting the cover off extension 19 when the cover may be applied directly to the vessel itself instead of the extension member.

If the vessel 8 is provided with not merely one extension member, such as described in connection with member 19, but with several, one extension being of a two-quart capacity and another extension being rated at four quarts, or both extensions rated at different figures than those mentioned, it is obvious that when, for example, a two-quart extension is added to the vessel which may be a four-quart member, the result is a six-quart capacity. If, on the other hand, an extension rated at four quarts is added to the four-quart vessel, an eight-quart capacity results. Then, again, if first the four-quart extension is added to the four-quart vessel, and then the two-quart extension member added to the four-quart extension member, the ensemble will have a ten-quart capacity. Thus, the vessel with its two extensions will have four different capacities which may be selected at will. Other capacities than those mentioned may be used, but these capacities are merely enumerated as examples, and in no way limit any feature of the invention.

From the foregoing it is evident that a pressure cooker may be increased in capacity by simply adding cylindrical extension members thereto which are interchangeable with each other or may be added to each other and to the vessel in any order or selection, and the cover is thus designed to fit upon any extension member, as well upon the vessel alone. In other words, the lower ends of the extension members are adapted to engage upon the upper edge of the vessel proper in the same manner as the cover will normally fit thereon, while on the other hand the upper end or edge of each extension member will interfit with the cover or with the lower end of the one or more other extension members used, and in every operation a mere twist of the wrist is sufficient to engage one member with the other or with the vessel or the cover with any one of the members and with the vessel, as the case may be. It is preferred to have each extension member provided not only with the handle 21, but also with the opposite hooked supporting member 22 by which to facilitate manipulation of the extension member and also make it possible to carry not only the extension member as such, but also the entire vessel and extension member assembly to a designated spot by supporting the ensemble upon handle 21 and the extending supporting member 22. The latter extending supporting member and handle also may serve to support the vessel and extension member in place suspended between two projections upon a stove or the like.

Manifestly, variations may be resorted to and parts and features may be modified or used without others within the scope of the appended claim.

Having now fully described my invention, I claim:

The combination with a cylindrical receptacle having an open end, and an annular flange surrounding said open end and fixedly secured to said receptacle, of an open ended cylindrical casing positioned in aligned relation above said receptacle, means on the lower end of said casing and engaging the open end of said receptacle for fixedly coupling the casing to said receptacle, and a closure for closing the upper end of said casing, said means comprising a depending neck, another annular flange surrounding the neck adjacent its lower end and fixedly secured thereto, said last-named flange being spaced from the lower end of said neck and having a notch formed in its under surface adjacent said neck for receiving the open end of said receptacle, a sealing gasket interposed in said notch and engaging the open end of said receptacle to form an airtight seal, a skirt depending from the outer edge of said last-named flange, said skirt having its free end turned inwardly to form a ledge, and means carried by said ledge and interlocking with said first-named flange whereby said casing is held in secured relation with said receptacle.

NORMAN M. GRIFFIN.

REFERENCES CITED

The following references are of record in the file of this patent:

UNITED STATES PATENTS

| Number | Name | Date |
|---|---|---|
| 315,917 | Dean | Apr. 14, 1885 |
| 993,013 | Bartlett | May 23, 1911 |
| 1,362,878 | Ladd | Dec. 21, 1920 |
| 2,218,188 | Wittenberg | Oct. 15, 1940 |
| 2,399,115 | Hansen | Apr. 23, 1946 |
| 2,472,620 | Rhodes et al. | June 7, 1949 |